June 30, 1953  J. M. RICHARDS  2,643,575
ALIGNMENT TARGET FOR TESTING EYES
Filed Aug. 7, 1947  2 Sheets-Sheet 1

INVENTOR.
John Mark Richards
BY Emery, Varney, Whittemore & Dix
ATTORNEY.

Patented June 30, 1953

2,643,575

UNITED STATES PATENT OFFICE 2,643,575

ALIGNMENT TARGET FOR TESTING EYES

John Mark Richards, Stony Point, N. Y.

Application August 7, 1947, Serial No. 766,974

3 Claims. (Cl. 88—20)

This invention relates to apparatus and methods for testing eyes.

One object of the invention is to provide a set of targets including a first pair of targets for testing tonic extraocular muscle imbalance of the eyes about their vertical rotational axes in the horizontal meridian only, such imbalance being known as horizontal tonic muscle imbalance; a second pair of targets that test for imbalance about their horizontal rotational axes in the vertical meridian only, this latter imbalance being known as vertical tonic muscle imbalance. The invention includes also a pair of targets for testing the eyes for torsional tonic muscle imbalance about their anteroposterior or visual axes.

I have discovered that by testing separately for the different tonic muscle imbalances, the results of these tests serve also to determine any unequal magnification between the two eyes, a defect known as "aniseikonia." The necessary conversions are made by means of special formulae that I have devised. The targets provide data for both the prism or symmetrical muscle imbalance and eikonic or asymmetrical muscle imbalance prescription designated as an "anisophoric lens" correction of the patient whose eyes are tested in accordance with this invention.

The combined defects of aniseikonia and horizontal, vertical and/or torsional tonic muscle imbalance may be termed "anisotonus," and because of the features by which the targets of this invention provide data for correcting these combined defects, the targets are designated as "anisotonic targets."

Another object of the invention is to provide targets that cause the eyes to become relatively fixed ("fused") in two axes of rotation but prevent fusion in the other axis of rotation. This result is attained for the ocular rotational axes in the plane perpendicular to the visual axis by having on each target of a pair, an object which has no discrete fusional points or limits in the meridian perpendicular to the ocular rotational axis in which fusion is to be prevented and a straight line extending across the entire field of vision provides such an object. A circular object to prevent torsional fusion is used on the targets for testing the eyes for torsional tonic muscle imbalance about their anteroposterior or visual axes.

Other features, objects, and advantages of the invention will appear or be pointed out as the description proceeds.

Figure 1:
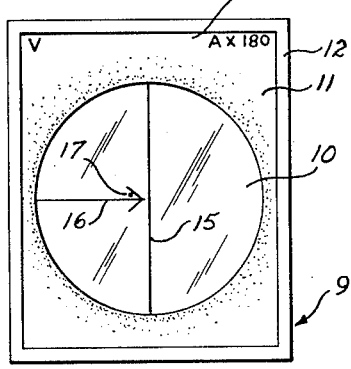
Figure 2:
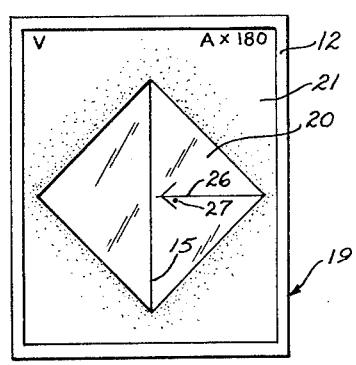

In the drawing, forming a part hereof, in which like reference characters indicate corresponding parts in all the views, Figures 1 and 2 are front views of a pair of slides for testing tonic muscle imbalance in the vertical meridian, the slides being for opposite eyes.

Figure 3:
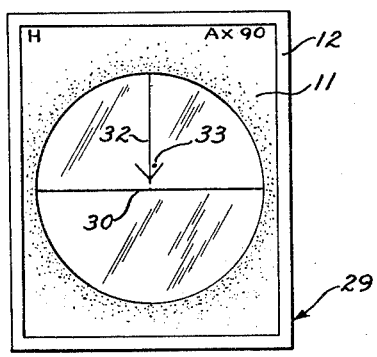
Figure 4:
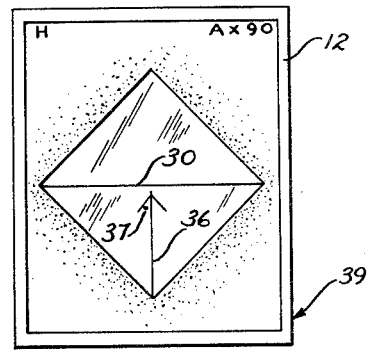
Figure 5:
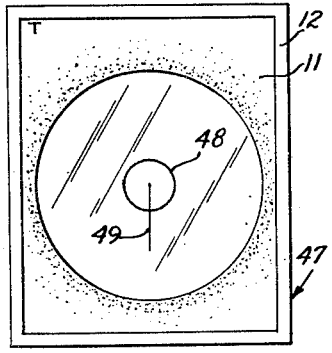
Figure 6:
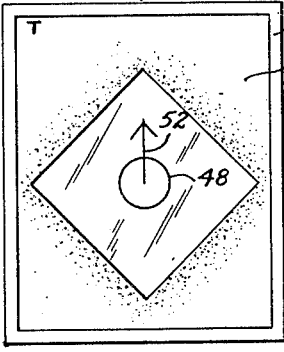

Figures 3 and 4 show another pair of slides similar to Figures 1 and 2 but with markings for measuring tonic muscle imbalance in the horizontal meridian, Figures 5 and 6 show a pair of slides for use in measuring torsion defects, these slides being also for opposite eyes.

Figure 7:
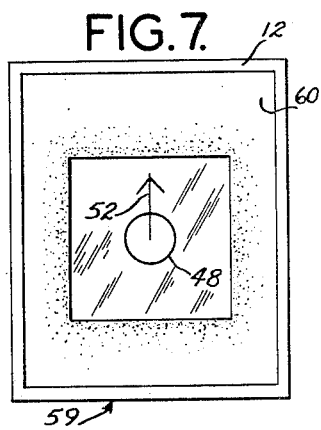
Figure 8:
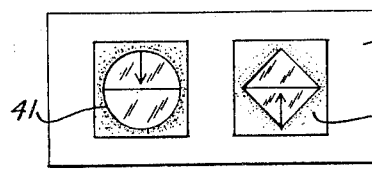
Figure 9:
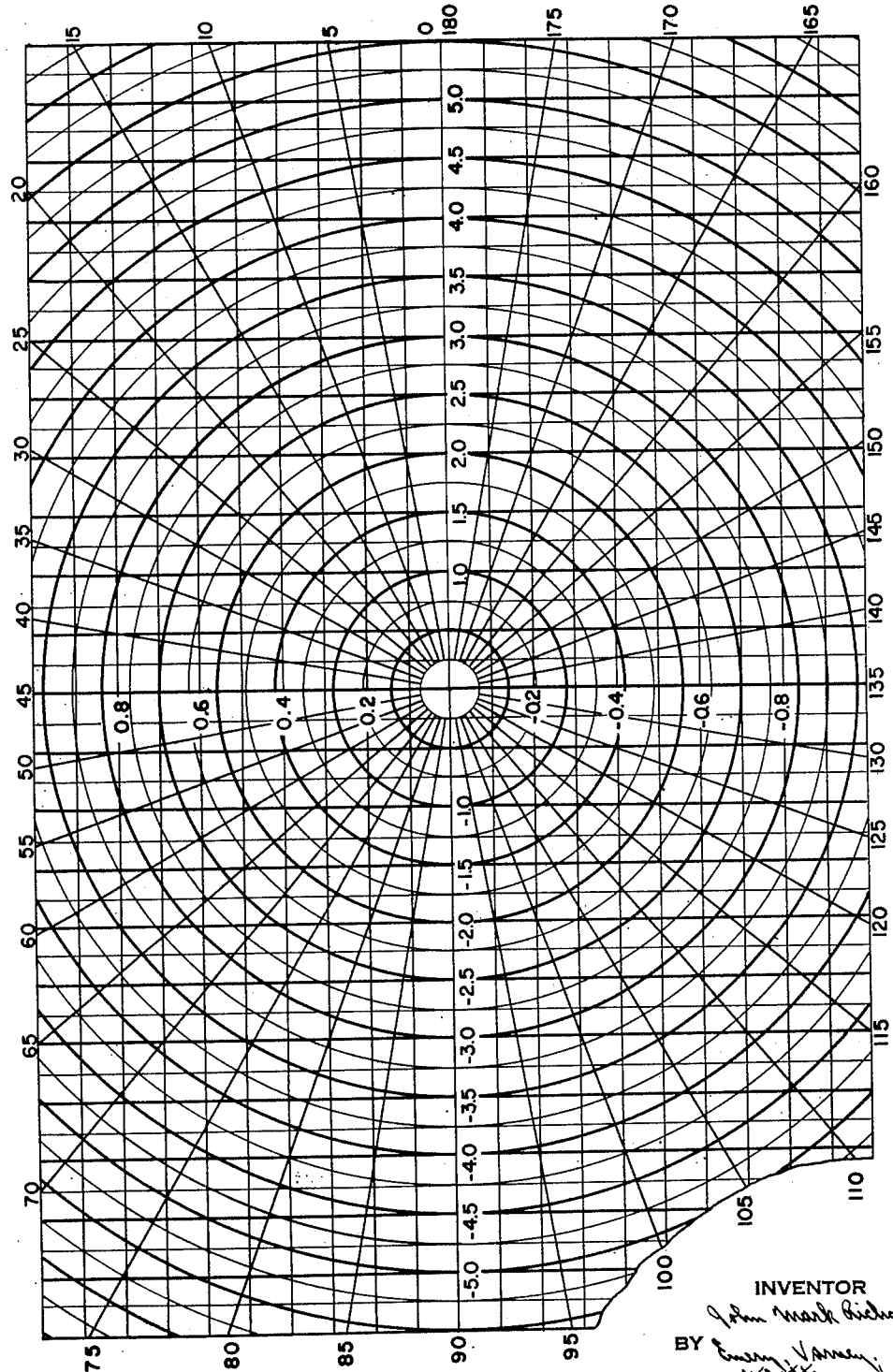

Figure 7 shows a target slide similar to Figure 6 but with the outline of the mask in a different relation to the markings on the slide, Figure 8 shows a modified form of the invention in which two targets are mounted on a common support, Figure 9 shows a transformation graph allowing arrival at a composite lens prescription with data obtained from the three types of "anisophoric targets" illustrated in the preceding Figures.

The target 9 shown in Figure 1 comprises a glass lantern slide having a clear transparent field 10 surrounded by a mask 11 having a circular opening. The slide has an edge binding 12 around all four sides and has a label space 13 with identifying indicia at the upper end of the mask 11. A heavy vertical line 15 extends across the entire field 10, and there is an alignment indicator comprising an arrow 16 at one side of the line 15 and preferably spaced a slight distance from the line. A mark or dot 17 on the upper side of the arrowhead is used for identifying the arrow as compared with the complementary arrow on the slide used for the other eye.

Figure 2 shows a companion target 19 that is used with the target 9 of Figure 1. The target 19 is shown in Figure 2 as a lantern slide and it has a field 20 surrounded by a mask 21 with a rectangular opening in contrast to the circular opening of the mask 11. These mask openings are of different geometrical shape so as to avoid any tendency on the part of the patient to fuse any part of the margin of the field on one target with the margin of the field of the other target. If the targets are black with light lines, the masking of the field becomes less important because the edges of the field can be made relatively invisible or indistinct depending upon the instrument with which the targets are used.

The target 19 has a heavy center line 15 which is the same as the line 15 of the target 9. When the targets 9 and 19 are in use, the patient fuses the lines 15, and this fusion is in the horizontal meridian. It is a feature of the invention that the lines 15 which are the only objects common to the two targets 9 and 19, extend across the entire field of vision and have no ends which the patient can fuse in the vertical meridian.

Since the targets 9 and 19 provide no markings or limits on which the eyes can fuse in the vertical meridian, the patient's eyes remain at rest in the vertical meridian when using these targets. There is an arrow 26 on one side of the line 15 in the target 19 and this arrow has an identifying dot 27 located on the underside of the arrow and preferably of a different color from the dot 17 of target 9.

Although the arrows 16 and 26 are located at the same vertical level on the targets 9 and 19, they will not be seen on the same level by a patient having a vertical tonic muscle imbalance. The examiner corrects the apparent misalignment of the arrows 16 and 26 by either moving the appartus in which the targets 9 and 19 are supported, or by interposing between one eye of the patient and the corresponding target 9 or 19 a lens having prismatic effect. If the correction is made by moving the part of the apparatus by which one of the targets is carried, the motion is preferably made about the center of rotation of the eye, and accurate equipment is provided for measuring the exact angle through which the target must be moved to correct the apparent misalignment of the arrows 16 and 26. The identifying dots 17 and 27 are useful in questioning the patient to find out which of the arrows appears higher than the other.

Although the targets 9 and 19 are shown as transparent lantern slides, these targets may be translucent slides, or opaque diagrams lighted from the front, and for some types of testing instruments, the targets 9 and 19 can be attached to the same support, such as a common back, so they will not move with respect to one another. When such attached targets are used, apparent alignment has to be obtained by bringing different pairs of targets into the patient's field of vision until a pair is found that appears to the patient to have the arrows in alignment. For a patient having a vertical tonic muscle imbalance the targets that appear to be in alignment will actually have one of the arrows 16 or 26 higher than the other, and the examiner can tell from the label on the apparently aligned targets how much it would have been necessary to move one target vertically with respect to the other to produce the apparent alignment. Also lenses with prismatic effect can be interposed between the eyes and the targets to change the apparent relative vertical alignment of the targets.

The arrows 16 and 26 are merely representative of alignment indicators, and markings other than arrows can be used, as for example, lines without arrowheads, or triangles or various geometrical shapes with or without lines.

Figure 3 shows a target 29 similar to the target 9 but having a fushion line 30 extending across the field of vision in a horizontal direction instead of in the vertical direction. An alignment indicator comprising an arrow 32 with an identifying dot 33 is located above the line 30 on the target 29.

Figure 4 shows a companion target 39 that is used for one eye when the target 29 is used for the other eye. This target 39 has the heavy horizontal fusion line 30 corresponding to the line 30 of target 29, and has an alignment indicator comprising an arrow 36 and an identifying dot 37 located below the line 30.

When the targets 29 and 39 are located in eye testing equipment, the arrows 32 and 36 should appear to the patient to be in alignment. Patients having a horizontal tonic muscle imbalance will see one or the other of the arrows 32 or 36 to the right or left of the other, and the examiner adjusts the position of one target horizontally toward the left or right until the patient sees the arrows 32 and 36 in alignment. As in the case of the targets 9 and 19, the targets 29 and 39 can be mounted on a common back, and different pairs of targets can be substituted for one another instead of moving one target to determine the degree of horizontal tonic muscle imbalance. Also lenses with prismatic effect can be used to align the targets. Light polarizing targets can be used in the same way as the other targets or with the targets for both eyes located so that they are on the same target area or on partially overlapping areas and with the target lines for the respective eyes polarized in different planes, as by covering with a polarizing sheet. Oppositely polarized lenses are used to view the polarized targets. These targets can be mounted in a book or can be a series of superimposed plates suitably masked and illuminated.

From the description thus far it will be apparent that there are three methods that can be employed in using targets embodying this invention. In one method prisms, or lenses with prismatic effect, are inserted between a target and the patient's eye to cause an apparent shift in the position of the target. The second method is to use a target with an instrument having movable barrels through which the patient views the targets. These barrels and the target holders carried by them can be swung one way or the other to shift one target with respect to the other. The third method is to move the targets themselves, that is, to shift one or both of the targets horizontally, or vertically, or to rotate one target with respect to the other, to bring markings into alignment with one another.

Figure 8 shows a target 41 which corresponds with the target 29, and another target 42 which corresponds with the target 39. These targets 41 and 42 are attached to a common back 43 and such a pair of targets is used in a testing instrument structurally similar to a stereoscope, that is, with lenses for viewing the respective targets and a septum extending from a position between the eyes and near enough to the center region of the support 43 to prevent the right eye from seeing the left target and the left eye from seeing the right target.

In testing eyes with the pair of targets shown in Figures 1 and 2, or the pair of targets shown in Figures 3 and 4, different tests must be made for different positions of gaze. The eyes are tested when looking directly to the front, and with the targets at different effective distances from the eyes. These effective distances are changed by changing the spacing of the targets transversely of the line of vision. If the targets are adjusted so that both eyes are looking along parallel axes when the lines 15 are fused, the slides are at an effective distance of infinity from the eyes. By moving the slides closer together, the effective distance is shortened. For practical purposes it is sufficient to test the eyes for distant vision with the targets adjusted for 6 meters or more, and again for close vision with the targets adjusted for about 40 centimeters of effective distance.

After making a test in "eyes front" position, the position of the targets is adjusted, while the patient's head remains stationary, so that the eyes look toward the right in viewing the targets. This angle toward the right may be of the order of 20°, or may be more or less depending upon the test equipment used. After finding the necessary adjustment of the targets to obtain alignment in the eyes right position, the equipment is again adjusted so that the patient looks toward the left in viewing the targets. Tests are also made with the eyes looking up toward the targets and looking down, both for the eyes front position and the eyes right and eyes left positions. There are, therefore, nine cardinal positions of gaze in which the eyes are tested. For practical purposes, however, it is usually not necessary to make tests for all of these positions since the differences in the results obtained are not sufficient to change the prescription from that obtained by tests in the eyes front, eyes right and eyes left positions when not looking either up or down; and with the eyes front, eyes up and eyes down positions when not looking either to the right or left. Sometimes the distance tests are made in the intermediate level plane, and the near vision tests are made with the patient looking down, as when reading.

Tests are made in the different positions of gaze for horizontal tonic muscle imbalance, and other tests in similar positions are made for vertical tonic muscle imbalance, using the different pairs of targets or when square targets are used, by turning the targets through 90 degrees; or by turning the target holders of the apparatus through 90 degrees. It is a feature of this invention that the eyes fuse an object in two perpendicular ocular rotational axes while remaining at rest in the other axis perpendicular to both the "fused" or stationary axes. The ocular axes referred to herein are the primary axes. When both eyes view an object having limits in both horizontal and vertical directions, it is not possible to tell how much one eye has to adjust itself to obtain the fusion. With the targets of Figures 1 to 4 the tonic muscle imbalance of the eyes in both the horizontal and vertical meridians is determined separately and without having either affect the other.

The data obtained from the tests includes the different angles subtended by the distance of the target movement necessary to bring the objects on the targets into alignment at different positions of gaze. For use in the transformation formulae, these angles will be designated by the letter D, and they are converted to their equivalent in prism diopters. The subscript $f$ indicates that the angle is for the eyes front position, $r$ indicates eyes right, and $l$ is for eyes left. The subscripts $h$ and $v$ refer to the horizontal and vertical meridians, respectively. The subscript $u$ is for eyes up and the subscript $d$ is for eyes down. The prism correction required, also in terms of prism diopters, is the quantity $D_h$ or $D_v$ in the formula; $P_h$ or $P_v$ is the percentage magnification of one eye in excess of the other; and $W$ is the tangent of the angle of departure from the eyes front position, symmetrically for the eyes right or the eyes left position of gaze or for the eyes up or the eyes down position of gaze.

$D_f$ usually equals $D_h$. When $D_f$ is not equal to $D_h$, $D_f$ instead of $D_h$ is occasionally chosen for the prism prescription depending upon clinical judgment of which is preferable. For example with convergent tonic muscle imbalance if $D_f$ were greater than $D_h$, $D_h$ would be used, but with a divergent tonic muscle imbalance if $D_f$ were greater than $D_h$, $D_f$ would have to be used.

Certain sign conventions must be observed:

|  |  | Sign |
|---|---|---|
| $P_h$ or $P_v$ | increased magnification in the right eye>left eye. | + |
|  | increased magnification in the left eye>right eye. | − |
| $W$ |  | + |
| Horizontal tonic muscle imbalance. | convergent tonic muscle imbalance. | − |
|  | divergent tonic muscle imbalance. | + |
| Vertical tonic muscle imbalance. | sursumduction of right eye or deorsumduction of left eye. | + |
|  | sursumduction of left eye or deorsumduction of right eye. | − |

The formulae used are as follows:

For horizontal tonic muscle imbalances the error of percent magnification is found by:

$$P_h = \frac{D_r - D_l}{2W}$$

while the prism error is found by:

$$D_h = \frac{D_r + D_l}{2}$$

For vertical tonic muscle imbalance the error of percent magnification is found by:

$$P_v = \frac{D_u - D_d}{2W}$$

while the prism error is found by $$D_v = \frac{D_u - D_d}{2}$$

The nine cardinal positions of gaze used for tonic muscle imbalance measurement provide three horizontal and three vertical meridians of data which can be applied through the preceding formulae to obtain the desired errors of percent magnification difference ($P_h$ or $P_v$) between the two eyes or/and the prism error ($D_h$ or $D_v$) in these three horizontal and vertical meridians.

Application of this data must be made with careful clinical judgment modifying the final prescription. For example, the usual and simplest procedure would be to select the horizontal and vertical data including the eyes front position which is the most important position functionally. This would be the only data considered for the final prescription here (assuming the torsional error were zero), unless one of the horizontal or vertical meridians not including the eyes front position had an extraordinarily large defect which included with the other two similar meridians would give an average error different from the error of the data obtained from the meridian including the eyes front position only. In this case the average of all three meridians is probably the most feasible clinical correction.

To this point, regarding application of the data we have assumed that the torsional error was zero. Thus, any given prescription now would be given in the horizontal or/and vertical meridians for the magnification error correction, and in these meridians or their resultant for the prism prescription. Any power prescription needed by the patient would have to be combined with this. Torsional errors may modify some of these data.

Figure 5 shows a target slide 47 with center circular marking providing no torsional fusion shown as comprising a circle 48 and with a line 49 extending straight down from the center of the slide. A companion target slide 51 is shown in Figure 6 with a circle 48 in the same position as in the slide 47 and with a line 52 extending directly upward from the center of the target slide. In the construction shown, there is an arrow head at the upper end of the line 52.

In order to find out whether the patient requires a meridional correction for torsional tonic muscle imbalance, the eyes are tested with the targets of Figures 5 and 6, preferably in apparatus in which the target holders have already been adjusted, by using the targets of Figs. 1–4, to compensate for any horizontal or vertical tonic muscle imbalance.

The patient fuses the circles 48, and the lines 49 and 52 of the targets 47 and 51, appear to be in alignment, if the patient has no torsional tonic muscle imbalance. If the lines 49 and 52 do not appear to be in alignment, the examiner turns the holder of one of the targets 47 or 51 until the lines 49 and 52 do appear to be in alignment. The angle through which the target has been turned to obtain apparent alignment is a measure of the torsional tonic muscle imbalance. When using targets that are attached to a common back and that cannot be turned with respect to one another, successive pairs of targets must be used having one of the targets mounted in a torted position with respect to the other.

Fig. 7 shows a target 59 with a mask 60 which has a rectangular opening oriented differently from the openings in the masks 21 of the other targets 19, 39, and 51. The opening is the same size as those in the other targets, and Fig. 7 illustrates that the rectangular openings may be oriented in any direction, but the arrow head on the end of the line 52 is preferably spaced from the edge of the mask by a substantial distance so that the patient does not try to fuse the point of the arrow with the edge of the opposite mask. The lower end of the line 49 in Fig. 5 is located far enough from the edge of the mask to prevent a patient from fusing the end of this line with the edge of the mask 60 (Fig. 7) when the target of Fig. 7 is one of the targets used. Targets that are to be used in apparatus having provision for masking, can be made without masks.

The composite prescription is easiest arrived at with the already obtained $P_h$ and $P_v$ and $T$ data by transformation with the graph shown in Fig. 9. The use of the graph is as follows:

1. Tabulate $P_h$, $P_v$ and $T$ with proper regard for sign (v. s.).
2. Calculate $P_v - P_h$ and locate the quantity on the abscissa of the graph in percent magnification.
3. Locate $T$ on the ordinate of the graph in degrees of torsion.
4. Find the point $(P_v - P_h, T)$ on the graph.
5. Read the resultant, $R$, as the hypotenuse from point $(P_v - P_h, T)$ in terms of the abscissa units, reading back along the concentric lines ($f$ is always $+$).
6. Read directly the meridian of $f$ along radius $X$.
7. Calculate the overall percent magnification $O$ $$O = \tfrac{1}{2}(P_v + P_h - f)$$

8. Tabulate together the overall percent magnification (step 7) and the meridional magnification needed to correct the torsion (step 5).
9. Transpose this to more convenient form, for example, to co-incide, if desired, with any power cylinder needed in a given patient's prescription.

By adding to this form of step 9, the prism prescription resultant of $D_h$ or/and $D_v$ as already calculated; the final total prescription including power (refraction), magnification and prism error is composed.

In the examination sequence, the patient is tested for "refraction" or power defects first and wears corrective "refractive" lenses at the time of taking the tests with the targets of this invention. A crude initial adjustment in the horizontal meridian is made, if necessary, to enable the patient to fuse the lines 15 of the first pair of targets. The test with the targets 29 and 39 is made after the target holders have been adjusted to compensate for any vertical tonic muscle imbalance.

Departure from the preferred testing sequence can be made, and various modifications can be made in the targets without departing from the invention as defined in the claims.

I claim as my invention:

1. A pair of targets for testing eyes for muscle imbalance, said pair comprising a first target member having an observation field with markings thereon including a line extending across the entire observation field of that target member and serving as target means for observation by the right eye, a second target member having an observation field with markings thereon and on which the only marking common with the first target member is a line similar to that on the first target member and at a location in the field similar to the location of the line in the observation field of the first target member and extending across the entire observation field of that target member and serving as target means for observation by the left eye, whereby the eyes fuse the lines of both target means in one meridian, which meridian extends at right angles to the direction in which said lines extend, and the eyes remain at rest in the meridian that extends in the direction of said lines since both of the observation fields of said target members are free of any common markings that have end limits or other discrete fusion points which the eyes can fuse in the meridian that extends parallel to the direction of said lines, the markings on the first target member including also an alignment marking constituting a part of the target means thereof and located at one side of the line on that target member, and the markings on the second target member including also a complementary alignment marking constituting a part of the target means thereof and located on the other side of the line of said second target member, the alignment markings being located at predetermined positions with respect to one another along the length of said lines so that the apparent positions of the alignment markings as viewed by the patient gives an indication of any muscle imbalance in the meridian parallel to the lines on said target members.

2. The target members described in claim 1, with each of the alignment markings comprising an arrow head pointing toward the line of the target member on which the arrow head is located, and with the tips of the arrow head markings spaced from the lines toward which they point.

3. The target members described in claim 1, with a common support on which both of the target members are carried in a fixed and predetermined relation to one another and with the lines on the respective target members substantially parallel to one another.

JOHN MARK RICHARDS.

References Cited in the file of this patent

UNITED STATES PATENTS

| Number | Name | Date |
|---|---|---|
| 1,650,768 | Reaves | Nov. 29, 1927 |
| 1,944,871 | Ames et al. | Jan. 30, 1934 |
| 1,946,925 | Ames | Feb. 13, 1934 |
| 2,196,904 | Sherman | Apr. 9, 1940 |
| 2,238,207 | Ames et al. | Apr. 15, 1941 |
| 2,376,554 | Ranoe | May 22, 1945 |
| 2,418,939 | Ames | May 6, 1947 |

OTHER REFERENCES

Helmholtz: Text; Physiological Optics, vol. 111 as translated by Southall, 1925, pages 444 and 450, Plate II (Stereogram G) and Plate V (Stereogram R). Publ. by Optical Society of America.

The Stereo Campimeter (Instruction Book), published by Bausch and Lomb Optical Company, H-140, IV-30, 1930, pages 20 and 21. Copy in Class 88-20.

Ogle: article in Archieves of Ophthalmology, vol. 22, December 1939, pages 1046-1053. Copy of article in 88/20.

Giles: Text; The Practice of Orthoptics, page 138, 1947 (original printing 1943). Publ. by Hammond and Hammond & Co., London. Copy in Division 7.